United States Patent

Yang et al.

[11] Patent Number: 5,841,677
[45] Date of Patent: Nov. 24, 1998

[54] METHOD AND APPARATUS FOR DISPATCHING LOTS IN A FACTORY

[75] Inventors: Terry H. Yang; Harry L. Chu, both of Hsinchu, Taiwan

[73] Assignee: Taiwan Semiconductor Manufacturing Co., Ltd., Hsinchu, Taiwan

[21] Appl. No.: 859,952

[22] Filed: May 21, 1997

[51] Int. Cl.[6] .............................. G06F 19/00; G06G 7/66
[52] U.S. Cl. ............... 364/569; 364/468.05; 364/468.06; 364/468.07; 364/468.08; 705/7; 705/8
[58] Field of Search .................. 364/468.05, 468.06, 364/468.07, 468.08, 468.19, 468.28, 569; 705/8, 7

[56] References Cited

U.S. PATENT DOCUMENTS

| | | | |
|---|---|---|---|
| 5,170,355 | 12/1992 | Hadari et al. ............................... | 705/8 |
| 5,359,524 | 10/1994 | Rohan ................................ | 364/468.05 |
| 5,375,062 | 12/1994 | Aoki ................................... | 364/468.28 |
| 5,442,561 | 8/1995 | Yoshizawa et al. ................ | 364/468.06 |
| 5,444,632 | 8/1995 | Kline et al. ......................... | 364/468.06 |
| 5,523,952 | 6/1996 | Inada ................................... | 364/468.06 |
| 5,546,326 | 8/1996 | Tai et al. ............................. | 364/468.05 |
| 5,559,710 | 9/1996 | Shahraray et al. ................. | 364/468.06 |
| 5,612,886 | 3/1997 | Weng ................................... | 364/468.07 |
| 5,721,686 | 2/1998 | Shahraray et al. ................. | 364/468.08 |

Primary Examiner—James P. Trammell
Assistant Examiner—Bryan Bui
Attorney, Agent, or Firm—Christensen, O'Connor, Johnson & Kindness PLLC

[57] ABSTRACT

A lot dispatching method and apparatus for dispatching WIP lots in the manufacture of semiconductor integrated circuits includes determining an average process time (T) and average number of lots per batch (a) of a succeeding process, and determining allowable lots (k) of a preceding process. The allowable lots (k) is equal to the preceding lots (m) undergoing the preceding process to the extent that the sum of (m) and the lots waiting to undergo the succeeding process (n) is not greater than the maximum batch size of the succeeding process. An allowable waiting time is then determined in accordance with a lot waiting rule, where the allowable waiting time represents the average time for processing the number of additional lots to be gained by waiting for the preceding process to complete. The allowable waiting time is determined by the equation k(T/a). If the expected waiting time for the preceding process to complete is greater than the determined allowable waiting time, the WIP lots (n) are immediately processed in the succeeding process; otherwise, the (n) WIP lots are not dispatched until the allowable lots (k) of the preceding process arrive, which are then combined into a single batch and dispatched into the succeeding process.

20 Claims, 3 Drawing Sheets

METHOD AND APPARATUS FOR DISPATCHING LOTS IN A FACTORY

BACKGROUND OF THE INVENTION

1. Field of the Invention

The present invention relates to dispatching systems, and particularly to a dispatching systems for dispatching lots in the manufacture of semiconductor integrated circuit devices.

2. Description of the Prior Art

A typical process for manufacturing semiconductor integrated circuit devices may include more than one hundred process steps, which are usually classified into following categories: diffusion; photolithography; etching; ion implantation; deposition; and sputtering. Among these categories, processes such as diffusion or deposition generally require a long process time to perform. Thus, these long process time processes are commonly performed on several wafer lots (commonly referred to as a batch). For example, a typical diffusion process step takes four to twelve hours for simultaneously processing a batch of up to six lots.

Scheduling policy thus becomes an important task in managing a production system. For example, a scheduling policy may be optimized to: maximize throughput of wafers out of the production system or factory; minimize the average time wafers spend in the factory to reduce the amount of work-in-progress (WIP); or maximize the utilization of machines (also referred to as tools). One aspect of production scheduling is controlling the release of pending jobs onto the processing floor (i.e., lot release). Another aspect of production scheduling is called lot dispatching, which deals with the control of jobs already on the processing floor. More specifically, lot dispatching concerns scheduling which lot(s) of the WIP are to be processed when a machine becomes available.

FIGS. 1A to 1C illustrate the concept of lot dispatching. Referring to FIG. 1A, a group of WIP lots 10 are waiting to be dispatched into the machine 12 once the machine 12 becomes available. In this example, there are n lots in the group of lots 10. Further, a group of lots 14 (in this example, m lots) are expected to arrive at the machine 12 at a known time. The time period defined by the time at which the machine becomes available and the time at which the lots 14 arrive at the machine 12 is referred to herein as the definite period for the lots 14.

FIG. 1B shows the situation in which the n lots 10 are immediately dispatched into the machine 12 without waiting for the expected m lots 14. This situation may result in inefficient use of the machine 12 when the definite period for the lots 14 is small and m is relatively large. FIG. 1C, however, illustrates the situation in which the machine 12 waits idle during the definite period, and then processes the total (n+m) lots together. This situation may result in inefficient use of the machine 12 if the definite period is long and m is relatively small.

In one typical conventional lot dispatching method used in a semiconductor wafer manufacturing line, the arrived lots are stored to await lot dispatching to various machines or tools on a batch basis. The pending lots are typically prioritized at this stage of the production process. A worker or operator then dispatches the lots to various machines as the machines become available. In this conventional method, the worker relies on his or her experience and judgment to decide whether to immediately dispatch a group of lots to the available machine or else wait the definite period for a group of expected lots. As can be expected, this subjective method often results in inefficient use of the processing machines. Further, as this conventional dispatching method is established by the operator through trial-an-error over a relatively large period of time, the established optimal criteria needs to be redetermined from the beginning when a condition, such as temperature, period of process or types of gasses used by the machine changes.

Accordingly, there is a need for an optimization-based dispatching rule for use in manufacturing semiconductor integrated circuit devices that use machines that require batch run and/or long process time.

SUMMARY OF THE INVENTION

In accordance with the present invention, a lot dispatching method and apparatus is provided for efficiently dispatching lots to a machine during the manufacture of semiconductor integrated circuit devices without relying on the subjective experience and judgment of a human operator. In one embodiment, the dispatching method and apparatus are advantageously used to dispatch lots into a machine when one or more WIP lots (e.g., n lots) are available to be processed when the machine becomes available and one or more other WIP lots (e.g., m lots) are expected after a definite period. The method and apparatus are used to decide whether to dispatch the n lots immediately or else wait for the definite period to dispatch the n lots combined with one or more lots from the group of m lots, so that use of the machine may be optimized In one embodiment, the average process time T and average number of lots per batch a are determined for the machine. From the values of T and a, the maximum allowable time for waiting for additional lots is calculated. More specifically, the maximum allowable waiting time for one additional lot up to the maximum batch size B of the machine is calculated according to the equation:

$$Tmax_k = k(T/a) \qquad (1)$$

where $Tmax_k$ is the maximum allowable waiting time for k additional lot(s), for each value of k between the integers between one and B, inclusive. The term (T/a) in equation 1 represents the average time needed to process a lot in one batch run of the machine. Thus, the maximum waiting time for the additional k lots is set to the k times (T/a) so that if the batch run is delayed until the additional k lots arrive, the average time per lot remains unchanged for this particular batch run. It will be appreciated that if this batch run is delayed longer than k(T/a), then this batch run will have a larger average time per lot and, thus, will be relatively less efficient. On the other hand, if this batch run is delayed less than k(T/a), then this batch run will have a smaller average time per lot and, thus, will be relatively more efficient.

The values of $Tmax_k$ calculated for each value of k are then stored. Then, when the machine becomes available, the definite period of the next expected m lots is compared to the stored values of $Tmax_k$. If the definite period of the additional m expected lots is greater than the $Tmax_k$ for k additional lots (k being equal to m to the extent that n+m does not exceed B), then the n pending lots are dispatched immediately into the machine. Conversely, if the definite period of the m additional lots is less than the $Tmax_k$, the n lots are not dispatched into the machine and, instead, the machine is kept idle until the m additional lots arrive. When the m additional lots arrive, the above process is repeated. Of course, in this second iteration, the number of pending lots is now equal to n+k lots. It will be appreciated that if n+k is equal to B, then the n+k lots are immediately dispatched into the machine as soon as the m additional lots arrive at the machine.

In one embodiment of the present invention, the dispatching apparatus includes a controller that is used to monitor: (i) the machine (also referred to herein as the succeeding process); (ii) the n WIP lots waiting to be processed by the machine; and (iii) a preceding machine (or the preceding process) from which the group of m expected WIP lots come from before being sent to the succeeding process. Through this monitoring, the controller determines T, a (in number of lots), and $Tmax_k$ (for k between one and B, inclusive), which the controller then compares to definite period for the expected m lots. In this embodiment, the controller determines whether to immediately dispatch the n lots or else wait for the m expected lots, as described above, and signals the human operator accordingly.

BRIEF DESCRIPTION OF THE DRAWINGS

The foregoing aspects and many of the attendant advantages of his invention will become more readily appreciated as the same becomes better understood by reference to the following detailed description, when taken in conjunction with the accompanying drawings, wherein.

DESCRIPTION OF THE PREFERRED EMBODIMENT

Figure 1A:
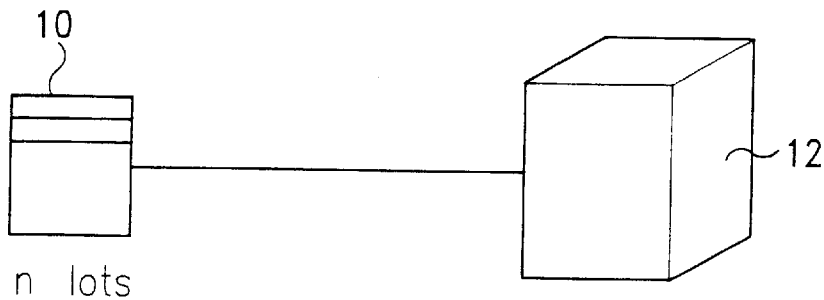
FIGS. 1A to 1C illustrate a conventional lot dispatching process.
Figure 1B:
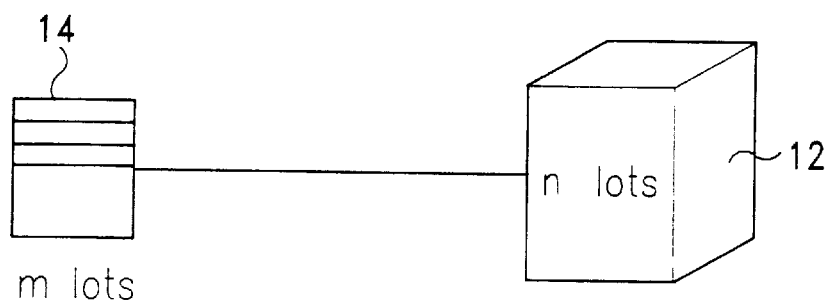
Figure 1C:
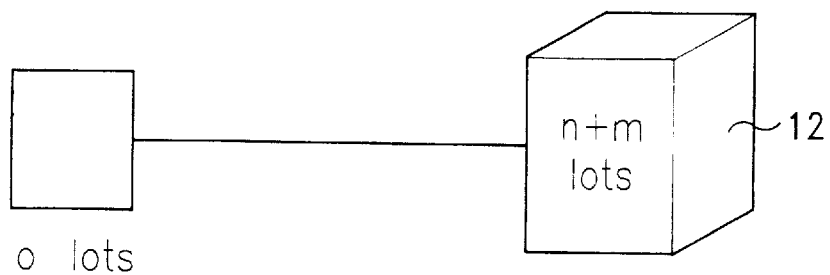
Figure 2A:
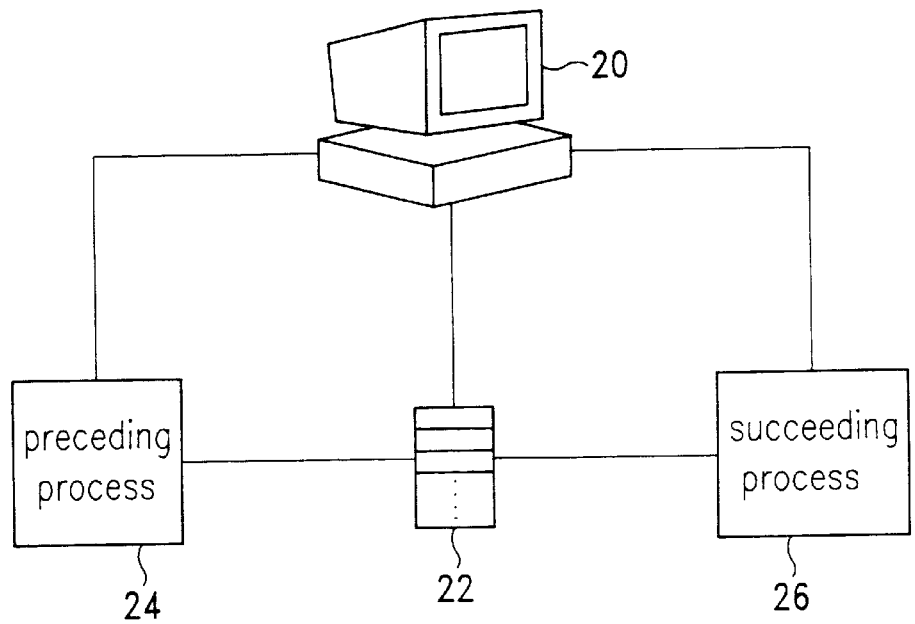
FIG. 2A is a block diagram of a portion of a dispatching system according to one embodiment of the present invention.

FIG. 2A shows a block diagram of a portion of a dispatching system 18 for use in manufacturing semiconductor integrated circuit devices having batch run and/or long process time processes. A controller 20 is used to monitor the status of: (i) a group of waiting WIP lots 22; (ii) a preceding process 24; and (iii) a succeeding process 26. In this embodiment, the controller 20 is a standard personal computer, although any suitable computer, or programmable controller or processor can be used. The controller 20 is programmed with the maximum batch size B of the succeeding process 26. Through monitoring the waiting lots 22, the preceding process 24 and the succeeding process 26, the controller 20 determines: (a) the number of lots n in the waiting lots 22; (b) the average process time T of succeeding process 26; (c) the number of lots m in the expected lots in the preceding process 24; (d) the definite period $t_m$ of the expected lots in the preceding process 24; and (e) the average number of lots a per batch of the succeeding process.

Figure 2B:
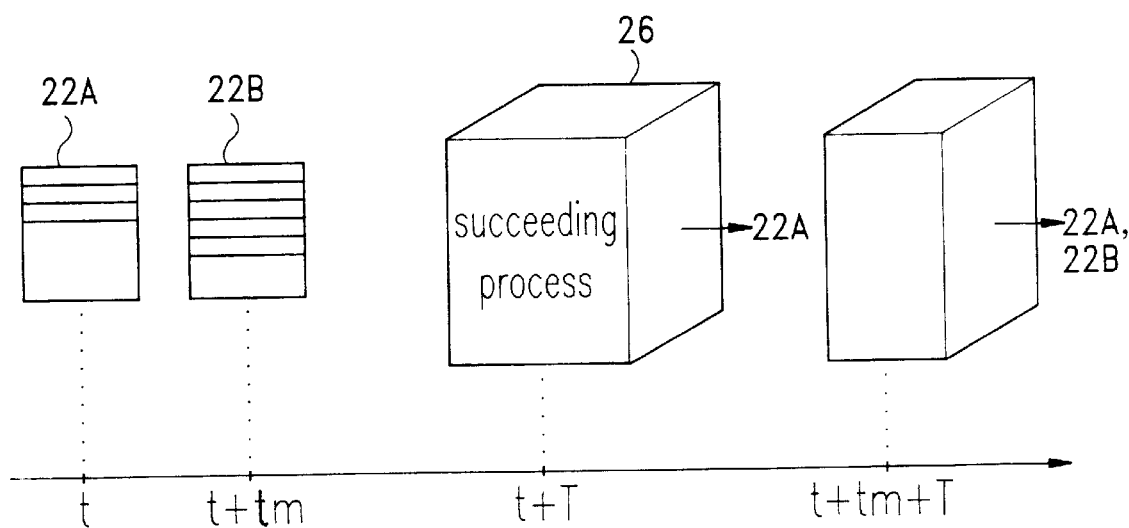
FIG. 2B is a time line illustrating how a group of WIP lots flow through a manufacturing process.

FIG. 2B illustrates an example of the timing of pertinent stages of the flow of WIP through the preceding and succeeding processes 24 and 26. Referring to FIGS. 2A and 2B, at time t, there are n lots of waiting WIP 22A and the succeeding process 26 is available. At this point, the preceding process 24 has a definite period of $t_m$. Therefore, at time $(t+t_m)$, the preceding process 24 (FIG. 2A) has finished processing the expected lots, thereby making available an additional m lots of WIP 22B. If at time t the controller 20 immediate dispatches the WIP 22A into the succeeding process 26, the n lots of WIP 22A exit the succeeding process 26 at the time (t+T). However, if the controller 20 holds the WIP 22A until the WIP 22B becomes available at time $(t+t_m)$, the number of WIP 22B available to the succeeding process 26 is increased by m lots to a total of (n+m) lots. These (n+m) lots are then dispatched into the succeeding process 26, which then exit the succeeding process 26 at the time $(t+t_m 30$ T).

The controller 20 dispatches the WIP 22A to the succeeding process 26 at the time t, or else dispatches the WIP 22A and 22B together to the succeeding process 26 at the time $(t+t_m)$, in accordance with a lot waiting rule (LWR) of the present invention. One embodiment of the LWR is described below in conjunction with FIG. 3.

Figure 3:
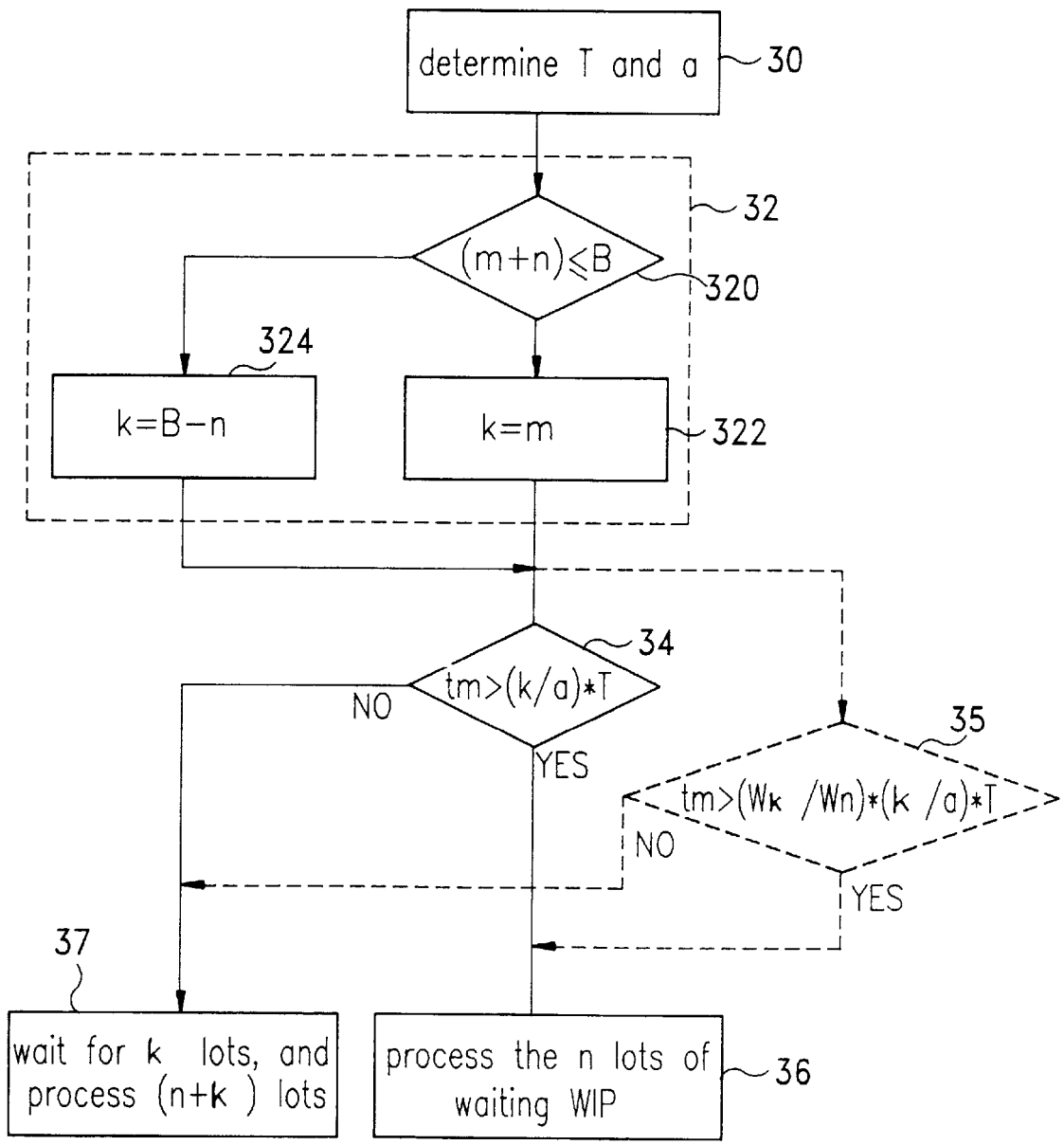
FIG. 3 is a flow diagram illustrating two embodiments of a lot dispatching method according to the present invention.

FIG. 3 is a flow diagram illustrative of a LWR of the present invention. Referring to FIGS. 2A and 3, one embodiment of the LWR is implemented as follows. In a step 30, the average process time T of the succeeding process 26 is determined over a suitable number of past cycles of the succeeding process. Similarly, the average number of lots a per batch of the succeeding process 26 is calculated.

Alternatively, the average process time T can be programmed and stored in the controller 20 as fixed data for processes in which the average process time remains substantially constant. In a further refinement, for a process in which the process conditions often change from cycle to cycle, the average process time T can be dynamically updated by, for example, looking up a table stored in the controller 20 that is indexed by the process conditions.

Next, the number of lots k of the expected m lots in the preceding process 24 that can be combined with the n pending lots is determined in a step 32. This determination of the allowable number k' is done by comparing, in a step 320, the maximum batch size B of the succeeding process 26 with the sum of the pending WIP n and the expected WIP m. If the total number (m+n) is less than or equal to the batch size B, the number of allowable lots k is equal to m (step 322); that is, all the lots in the preceding process 24 can be dispatched into the succeeding process 26, depending on the value of the definite period $t_m$, as described below. Otherwise, the number of allowable lots k is equal to (B−n) lots (step 324). In this situation, some, if not all, of the m lots of the preceding process 24 will not be dispatched with the pending n lots.

In order to optimize the efficiency of the succeeding process 26, a lot waiting rule (LWR) according to the present invention is applied to the definite period tm of the k allowable lots. In this embodiment, the LWR criteria or allowable waiting time for the succeeding process 26 is derived in a step 34 as k(T/a). If the definite period $t_m$ exceeds the LWR criteria k(T/a), a step 36 is performed in which the n pending lots are dispatched to the succeeding process 26 immediately. Otherwise, a step 37 is performed in which the n pending lots are held until the m expected lots arrive from the preceding process 24. When the m expected lots arrive, (n+k) lots are then dispatched to the succeeding process 26.

In an alternative embodiment, the controller 20 may calculate a look-up table indexed by the value of the additional allowable lots k. Table 1 below illustrates an example of the look-up table, which is calculated using equation 1 for values of k from one to six, inclusive. It is understood that the values of a and T are known, and the maximum allowable waiting time is assumed T if 6(T/a) is greater than T.

TABLE 1

| | | maximum allowable waiting time $Tmax_k$ | | | |
|---|---|---|---|---|---|
| k = 1 | k = 2 | k = 3 | k = 4 | k = 5 | k = 6 |
| (T/a) | 2(T/a) | 3(T/a) | 4(T/a) | 5(T/a) | 6(T/a) |

Then in the step 34, the controller 20 compares the definite period $t_m$ with the value in the look-up table corresponding to the value of k calculated in the step 32. The look-up table may be updated periodically to account for changes in the average number of lots a per batch and/or the average process time T.

The maximum allowable waiting time k(T/a) represents the average time needed to process k lots in a batch run. Thus, if the definite period is equal to the maximum waiting, the average time per lot for this batch run is not changed. Of course, if this batch run is delayed by more than this maximum allowable waiting time to process the k additional lots, this batch run will have a larger time per lot than the average (i.e., T/a), thereby decreasing the throughput of the succeeding process 26. On the other hand, if the batch run is delayed by less than this maximum allowable waiting time to process the k additional lots, this batch run will have a smaller time per lot, thereby increasing the throughput of the succeeding process 26.

Stated in a different manner, this LWR tends to optimize the usage of the succeeding process 26 because a high value for k indicates that there are few pending lots and, thus, the succeeding process 26 will be significantly under capacity if the pending lots are dispatched immediately. Accordingly, a larger waiting time is allowed when a large number of expected lots will be included in this batch run to get closer to the maximum capacity of the succeeding process 26. Conversely, if a low value of k is calculated, then a large number of lots are already pending. Thus, only a small waiting time is allowed to get the few additional lots to get closer to the fall capacity of the succeeded process 26.

Following simulation shows that this LWR provides higher throughput of lots compared to using a conventional method to dispatch lots. In this simulation, assume that process $L_i$ is the ith step of a IC process flow, and this step needs long process time with batch run. In addition, the process $L_i$ has only one kind of recipe, and average process time (T) of the process $L_i$ are 8 hours,
maximum batch size (B) of the process $L_i$ are 6 lots,
average number of lots (a) per batch processed at the process $L_i$ are 5 lots, and
number (n) of waiting WIP ready for running in the process $L_i$ at time t are 2 lots.

In the first case, an Always Run First (ARF) is used, in which any lot waiting in front of the process $L_i$ is processed. Assume that the number of lots (k) before the process $L_i$ are 3 lots, which will arrive at the process $L_i$ after 3 hours (tm) have elapsed. The ARF will recommend to process 2 lots immediately. However, the LWR will suggest to process total 5 lots (i.e., n+k=2+3) three (3) hours later because three (3) hours are less than 4.8 hours (i.e., $3/5*8$) as determined in the step 34. The loss of productivity from the ARF is estimated to be 1.125 lots (i.e., 3—$3*5/8$).

In the second case, an Always Wait Lots (AWL) is used, in which wafers are waited until there is no more wafer arrived in the near future. Assume that the number of lots (k) before the process $L_i$ are 3 lots, which will arrive at the process $L_i$ after 6 hours ($t_m$). The AWL will recommend to process total 5 lots after six (6) hours have elapsed. On the contrary, the LWR will process two (2) lots immediately because 6 hours are larger than 4.8 hours (i.e., $3/5*8$) as determined in the step 34. The loss of productivity from the AWL is estimated to be 0.75 lots (i.e., $6*5/8$-3).

Alternatively, those skilled in the art of dispatching systems can implement other embodiments for use with a computer integrated system (CIM) without undue experimentation in light of the disclosure. In a CIM embodiment, the controller 20 can automatically and dynamically dispatch lots according to the LWR with minimal help from human operators.

In another embodiment, the LWR can be modified to account for priority of the pending and expected lots. In this embodiment, weights corresponding to the priority of the lots are assigned to the pending (i.e., $w_n$) and expected lots (i.e., $w_k$). In this embodiment, a step 35 is performed after the step 32 in which ratio of the expected to pending weights is multiplied with the expression of the step 34. The resulting maximum allowable waiting time of the modified LWR becomes $(w_k/w_n)(k/a)T$.

In yet another embodiment of the present invention, the LWR is applied to a more complex processing flow having several different processes and recipes. For example, the process flow may have the succeeding process tools X, Y, and Z. Further, each of these tools has more than one recipe with a different corresponding average process time. Table 2 below summarizes the different processes of this example, with expressions for calculating the maximum allowable waiting time for each recipe.

TABLE 2

| | | | | maximum allowable waiting time $Tmax_k$ | | | | | |
|---|---|---|---|---|---|---|---|---|---|
| tool | process | recipe | process time | k = 1 | k = 2 | k = 3 | k = 4 | k = 5 | k = 6 |
| X | anneal | A | $T_A$ | $T_A$/ax | $2T_A$/ax | $3T_A$/ax | $4T_A$/ax | $5T_A$/ax | $T_A$ |
|   |        | B | $T_B$ | $T_B$/ax | $2T_B$/ax | $3T_B$/ax | $4T_B$/ax | $5T_B$/ax | $T_B$ |
| Y | gate   | C | $T_C$ | $T_C$/ay | $2T_C$/ay | $3T_C$/ay | $4T_C$/ay | $5T_C$/ay | $T_C$ |
|   | oxide  | D | $T_D$ | $T_D$/ay | $2T_D$/ay | $3T_D$/ay | $4T_D$/ay | $5T_D$/ay | $T_D$ |
| Z | well   | E | $T_E$ | $T_E$/az | $2T_E$/az | $3T_E$/az | $4T_E$/az | $5T_E$/az | $T_E$ |
|   | drive  | F | $T_F$ | $T_F$/az | $2T_F$/az | $3T_F$/az | $4T_F$/az | $5T_F$/az | $T_F$ |

More specifically, in Table 2: tool X is used in an anneal process having two different recipes A and B; tool Y is used in a gate oxide forming process having two different recipes C and D; and tool Z is used in a well driving process having two different recipes E and F. The fourth column lists the corresponding average process time for each recipe. The fifth through tenth columns list the maximum allowable waiting time for each value of the allowable lots k, assuming that the maximum number of latch per batch B is equal to six for each tool. The terms ax, ay and az are the average lots per batch for processes X, Y and Z, respectively. The controller 20 may have a look-up table corresponding to the data stored in the Table 2, and as a tool becomes available, the controller 20 calculates the allowable number of additional lots for the tool, and retrieves the maximum allowable wait time for the particular recipe being used by the too. Then the controller 20 compares the definite period $t_m$ of the next expected lots for this recipe of the tool to the retrieved maximum allowable wait time and uses the LWR to determine whether to dispatch the pending lots or else wait for the next expected lots.

Although specific embodiments including the preferred embodiment have been illustrated and described, it will be appreciated by those skilled in the art of dispatching systems that various modifications may be made without departing from the spirit and scope of the present invention, which is intended to be limited solely by the appended claims. For example, the number of the tools and the number of the recipes in each tool are not limited to those illustrated in the described embodiments. Moreover, the LWR disclosed in this application is not limited to the manufacture of semiconductor devices; rather, the LWR can be applied to other factory environments that have tools that require batch run and/or long process time.

What is claimed is:

1. A lot dispatching method for use in manufacturing a semiconductor integrated circuit device, wherein n pending work-in-progress (WIP) lots are waiting to undergo a succeeding process while m preceding WIP lots are undergoing a preceding process, n and m being integers greater than zero, the method comprising:

determining an average process time T of the succeeding process;

determining a number of allowable lots k of the m lots undergoing the preceding process, the sum of n and k being no greater than a maximum batch size B of the succeeding process;

determining an allowable waiting time for the k allowable lots, wherein the allowable waiting time dependent on an average time per lot for a batch run of the succeeding process; and dispatching the n pending lots into the succeeding process when the succeeding process becomes available if, at the time the succeeding process becomes available, the m lots from the preceding process are expected to arrive at the succeeding process after a waiting time that is greater than the determined allowable waiting time.

2. The method according to claim 1, wherein said dispatching the n pending lots into the succeeding process further comprises, when the waiting time of the m lots from the preceding process does not exceed the determined allowable waiting time, combining the n pending lots and the k allowable lots into a batch and dispatching these combined lots into the succeeding process when the m lots from the preceding process arrive at the succeeding process.

3. The method according to claim 1, wherein the average time per lot for a batch run of the succeeding process is a dependent on a ratio of an average process time T of the succeeding process to an average number of lots per batch a of the succeeding process, and wherein the allowable waiting time is proportional to k and T and inversely proportional to a.

4. The method according to claim 3, wherein the allowable waiting time is further dependent on a priority of the k allowable lots from the preceding process and a priority of the n pending lots waiting for the succeeding process.

5. The method according to claim 4, wherein the allowable waiting time is proportional to the priority of the k allowable lots and inversely proportional to the priority of the n pending lots.

6. The method according to claim 1, wherein allowable waiting times are generated for the succeeding process for all values of k from one to B.

7. The method according to claim 6, wherein allowable waiting times are generated for a plurality of succeeding processes.

8. The method according to claim 6, wherein a controller monitors said succeeding process and calculates and stores the generated allowable waiting times.

9. The method according to claim 8, wherein the controller is part of a computer integrated manufacturing (CIM) system.

10. The method according to claim 9, wherein said dispatching the n pending lots into the succeeding process is performed automatically by said controller.

11. Apparatus for dispatching work in process (WIP) lots in a factory, said apparatus comprising:

a succeeding tool configured to perform a succeeding process on a batch of lots;

a preceding tool configured to perform a preceding process on a batch of lots, wherein lots processed by the preceding tool are next processed by the succeeding tool; and a controller coupled to the succeeding tool and the preceding tool, wherein the controller is configured to dispatch lots into the succeeding tool according to a lot waiting rule that compares a calculated allowable waiting time to an expected waiting time for expected lots being processed by the preceding tool, the expected waiting time starting when the succeeding tool becomes available to process lots and ending when the expected lots from the preceding tool arrive at the succeeding tool, and wherein the allowable waiting time is dependent on an average time per lot for a batch run of the succeeding tool.

12. The apparatus according to claim 11, wherein, when the succeeding machine has one or more pending lots to process at a time when the succeeding tool becomes available to process lots, said controller is further configured to:

dispatch the one or more pending lots without waiting for the expected lots when the expected waiting time exceeds the allowable waiting time; and dispatch the one or more pending lots together with k lots of the expected lots when the expected waiting time does not exceed the allowable waiting time, k being an integer greater than zero and equal in number to the expected lots, up to a maximum batch size B of the succeeding tool.

13. The apparatus according to claim 11, wherein the average time per lot for a batch run of the succeeding tool is a dependent on an average process time T of the succeeding tool and an average number of lots per batch a of the succeeding tool, and wherein the allowable waiting time is proportional to k and T and inversely proportional to a.

14. The apparatus according to claim 13, wherein the allowable waiting time is further dependent on a priority of the k lots of the expected lots and a priority of the one or more pending lots.

15. The apparatus according to claim 14, wherein the allowable waiting time is proportional to the priority of the k lots of the expected lots and inversely proportional to the priority of the one or more pending lots.

16. The apparatus according to claim 15, wherein the controller determines and stored allowable waiting times for the succeeding tool for all values of k from one to B.

17. The apparatus according to claim 11, further comprising a plurality of succeeding tools and corresponding preceding tools, wherein the controller determines and stores allowable waiting times the plurality of succeeding tools.

18. The apparatus according to claim 17, wherein each of said plurality of tools is configured to support a plurality of recipes, the controller determines and stores allowable waiting times for each recipe of the plurality of recipes.

19. The apparatus according to claim 18, wherein the controller is configured to control dispatching of lots to the plurality of tools in accordance with the lot waiting rule.

20. Apparatus for dispatching work in process (WIP) lots in a factory, said apparatus comprising:

a succeeding tool configured to perform a succeeding process on a batch of lots, the succeeding tool having a maximum batch size B, an average process time T and an average batch size a;

a preceding tool configured to perform a preceding process on a batch of lots, wherein lots processed by the preceding tool are next processed by the succeeding tool; and a control means, coupled to the succeeding tool and the preceding tool, for dispatching lots into the succeeding tool according to a lot waiting rule, the control means comprising:

means for determining an average process time of the succeeding tool;

means for determining an average number of lots per batch of the succeeding tool;

means for determining an allowable number k of additional lots for the succeeding tool, wherein when the succeeding tool becomes available to process lots, the succeeding tool has n pending lots waiting to be dispatched into the succeeding tool, the preceding tool has m lots being processed, the m lots being expected to arrive at the succeeding tool after an expected waiting time, and the allowable lots k being equal to m when (n+m) does not exceed B and being equal to (B−n) when (n+m) exceeds B;

means for determining an allowable waiting time, wherein the allowable waiting time is proportional to k and T and inversely proportional to a; and means for comparing the allowable waiting time to the expected waiting time, wherein the control means dispatches the n pending lots into the succeeding tool without waiting for the allowable lots when the expected waiting time exceeds the maximum waiting time and dispatches a batch including the n pending lots and the k allowable lots into the succeeding tool when the k allowable lots arrive at the succeeding machine.

* * * * *